(12) United States Patent
Kocksch

(10) Patent No.: US 8,474,631 B2
(45) Date of Patent: Jul. 2, 2013

(54) FILTER SYSTEM AND FILTER ELEMENT FOR FILTERING FLUIDS

(75) Inventor: Christian Kocksch, Roemerberg (DE)

(73) Assignee: Mann+Hummel GmbH, Ludwigsburg (DE)

( * ) Notice: Subject to any disclaimer, the term of this patent is extended or adjusted under 35 U.S.C. 154(b) by 314 days.

(21) Appl. No.: 12/896,485

(22) Filed: Oct. 1, 2010

(65) Prior Publication Data

US 2011/0079550 A1    Apr. 7, 2011

(30) Foreign Application Priority Data

Oct. 6, 2009  (DE) .................. 10 2009 048 411

(51) Int. Cl.
*B01D 27/00* (2006.01)
*B01D 35/00* (2006.01)
*B01D 35/28* (2006.01)

(52) U.S. Cl.
USPC ............................. 210/450; 210/444; 210/454

(58) Field of Classification Search
USPC .................... 210/444, 497.01, 445, 451, 453, 210/455; 55/498, 502, 503
See application file for complete search history.

(56) References Cited

U.S. PATENT DOCUMENTS

2010/0032359 A1* 2/2010 Gillenberg et al. ........... 210/232

FOREIGN PATENT DOCUMENTS

| DE | 4432529 | 3/1996 |
| DE | 202006018334 | 4/2008 |

OTHER PUBLICATIONS

English machine translation of DE 44 32 529.*
German patent office Office Action on priority application DE 102009048411.6-27.

* cited by examiner

*Primary Examiner* — Ling Choi
*Assistant Examiner* — Catherine S Branch
(74) *Attorney, Agent, or Firm* — James Hasselbeck

(57) ABSTRACT

A filter system for filtering fluids has a filter head and a filter cup with a rim area, wherein the filter cup is connected detachably by the rim area by a rotational and/or plug-in movement to the filter head. A filter element is exchangeably arranged in the filter cup. A sealing device with several sealing areas is provided that seals the filter head relative to the filter cup. The filter element has a connecting end disk arranged at an end face that is facing the rim area of the filter cup. On the connecting end disk at least two of the sealing areas of the sealing device are arranged so as to extend circumferentially in such a way that a first sealing area seals the connecting end disk relative to the filter head and a second sealing area seals the connecting end disk relative to the filter cup.

14 Claims, 3 Drawing Sheets

FILTER SYSTEM AND FILTER ELEMENT FOR FILTERING FLUIDS

CROSS REFERENCE TO RELATED APPLICATIONS

This application claims the benefit under 35 USC 119 of foreign application DE 102009048411.6-27 filed in Germany on Oct. 6, 2009, and which is hereby incorporated by reference in its entirety.

BACKGROUND OF THE INVENTION

The invention concerns a filter system for filtering fluids, in particular of a motor vehicle, comprising a filter head, comprising a filter cup that is detachably connectable with its rim area to the filter head by means of a rotational and/or plug-in movement, comprising a filter element with preferably coaxial shape that is exchangeably arranged in the filter cup, and comprising a sealing device with at least one sealing area for sealing the filter head relative to the filter cup, wherein the filter element at an end face that is facing the rim area of the filter cup has a connecting end disk.

Moreover, the invention concerns a filter element, preferably in coaxial shape, of a filter system for filtering fluids, in particular of a motor vehicle, wherein the filter system comprises a filter head, a filter cup that is detachably connectable with its rim area to the filter head by means of an insertion and/or plug-in movement, and a sealing device with at least one sealing area for sealing the filter head relative to the filter cup, and wherein the filter element can be exchangeably arranged in the filter cup, and the filter element on at least one end face that in the mounted state faces the rim area of the filter cup has a connecting end disk.

Such filter systems or filter elements are used for filtering gaseous or liquid fluids. In motor vehicles and industrial motors, such filter systems are used for filtration of, in particular, combustion air or compressed air, fuel, in particular diesel fuel or gasoline, motor oil or hydraulic oil.

In known commercially available filter systems of this kind, the filter cup with its rim area is connected by means of a bayonet or screw connection by means of a combined rotational/plug-in movement to an appropriate receiving space of the filter head. The outer wall of the filter cup has in an area near its rim a circumferential sealing groove in which an O-ring seal is positioned. By means of the O-ring seal the filter cup is sealed in radial direction relative to the inner circumferential side of the receiving space of the filter head.

The invention has therefore the object to design a filter system and a filter element of the aforementioned kind such that a simple, reliable and robust sealing action of the filter cup relative to the filter head is enabled.

SUMMARY OF THE INVENTION

This object is solved according to the invention in that on the connecting end disk at least two sealing areas of the sealing device are arranged so as to extend circumferentially in such a way that one of the sealing areas seals the connecting end disk relative to the filter head and one of the sealing areas seals the connecting end disk relative to the filter cup.

According to the present invention, the sealing action of the filter head relative to the filter cup is thus realized by means of the filter element. An immediate sealing action between the filter cup and the filter head, as it is realized in the aforementioned known filter systems by means of an O-ring seal, is not employed here. Instead, the sealing action is realized by the connecting end disk of the filter element which is provided for this purpose with appropriate sealing areas. The connection between filter head and the filter cup thus only provides a securing action while the sealing action is realized by means of the connecting end disk of the filter element. The securing function and the sealing function are thus separate and can be optimized, respectively, without influencing each other. Since the sealing areas are arranged on the connecting end disk, a sealing groove or another different receptacle for the sealing areas within the radial outer circumferential surface of the wall of the filter cup is no longer needed. The wall of the filter cup in this way can have a reduced wall thickness in comparison to known filter systems with currently conventionally employed sealing devices where the sealing grooves in the wall are required. The connecting end disk with the sealing areas can moreover be designed such that the sealing action is enhanced by means of the fluid system pressure that exists in the filter system in that the sealing areas by means of the fluid system pressure are pressed against appropriate sealing surfaces of the filter cup and the filter head.

A further advantage resides in that the sealing areas upon exchange of the filter element are automatically exchanged also. An additional servicing of the sealing device, as is the case in known filter systems, is therefore not required here. In case of suspended mounting where the filter cup is connected from below in a suspended arrangement from the filter head, the filter element can first be inserted into the filter cup for installation and can then be mounted simply together with the filter cup by a rotational and/or plug-in movement in the receiving space of the filter head.

It is furthermore advantageous that it is easily detected should a filter element be used that does not match the filter cup or the filter head or should the filter element be mounted in the wrong way because the filter cup, the filter head, and the filter element are matched to one another with respect to the sealing action and interact with one another.

In an advantageous embodiment, the filter cup and the filter element can be cylindrical, in particular the filter element can be a round filter element or a filter element with an oval base surface. In case of cylindrical filter elements and filter cups, a beneficial ratio between active filter surface area—and thus filter efficiency—and the space requirement exists.

In a further advantageous embodiment, the radial outer rim area of the connecting end disk can be secured in axial direction between the filter head and the filter cup. In this way, the filter element can be secured in a stable way in the filter cup. The fixation can thus be realized automatically upon mounting of the filter cup on the filter head.

Advantageously, at least one of the sealing areas can be supported at least over sections thereof on the connecting end disk in radial direction in a seal-tight way. The connecting end disk and the sealing device can be designed such that a pressure force resulting from a fluid system pressure in the filter cup can enhance the sealing action in radial direction.

Moreover, advantageously at least one of the sealing areas can be supported at least with sections thereof on the connecting end disk in axial direction in a seal-tight way. The sealing action can be varied in this way by setting the axial insertion or push-on depth of the filter head in or onto the filter head.

In a further advantageous embodiment, at least two of the sealing areas can be arranged separate from one another. In this way, the sealing areas can be placed so as to be optimally matched to the shape of the rim area of the filter cup or of the receiving space of the filter head in order to obtain an optimal sealing action.

Advantageously, at least two of the sealing areas may be interconnected. In this way, the manufacturing expenditure and the mounting expenditure for the sealing areas are reduced.

In an alternative embodiment, the sealing action of the two sealing areas can be realized with a common shaped seal that is designed for sealing two sealing areas.

In order to enable an especially stable and simple connection between the connecting end disk and the sealing areas, advantageously at least one of the sealing areas can be embodied as a two-component part together with the connecting end disk.

In a further advantageous embodiment, the connecting end disk may have a plurality of fluid openings that are connected with a raw fluid side of a filter medium of the filter element. Through these fluid openings the fluid to be filtered can flow, preferably from an inflow space of the filter head, to the raw fluid side of filter medium of the filter element.

In a further advantageous embodiment, flow can be realized in reverse direction so that the fluid openings of the connecting end disk are connected with a clean fluid side of a filter medium of the filter element. Through these fluid openings, the filtered fluid can flow preferably from a clean fluid side of a filter medium of the filter element to the discharge space of a filter head.

The end disks and the support pipe can be manufactured of plastic material or can be made of metal in an alternative embodiment of the end disks or/and of the central pipe.

The object is moreover solved in accordance with the present invention in that on the connecting end disk at least two sealing areas of the sealing device are arranged so as to extend circumferentially in such a way that in the mounted state one of the sealing areas seals the connecting end disk relative to the filter head and one of the sealing areas seals the connecting end disk relative to the filter cup.

BRIEF DESCRIPTION OF THE DRAWINGS

Further advantages, features and details of the invention result from the following description, in which embodiments of the invention are explained in more detail with the aid of the drawing. A person skilled in the art will expediently consider the features that are disclosed in combination in the drawing, the description and the claims also individually and combine them to expedient further combinations.

DETAILED DESCRIPTION

Figure 1:
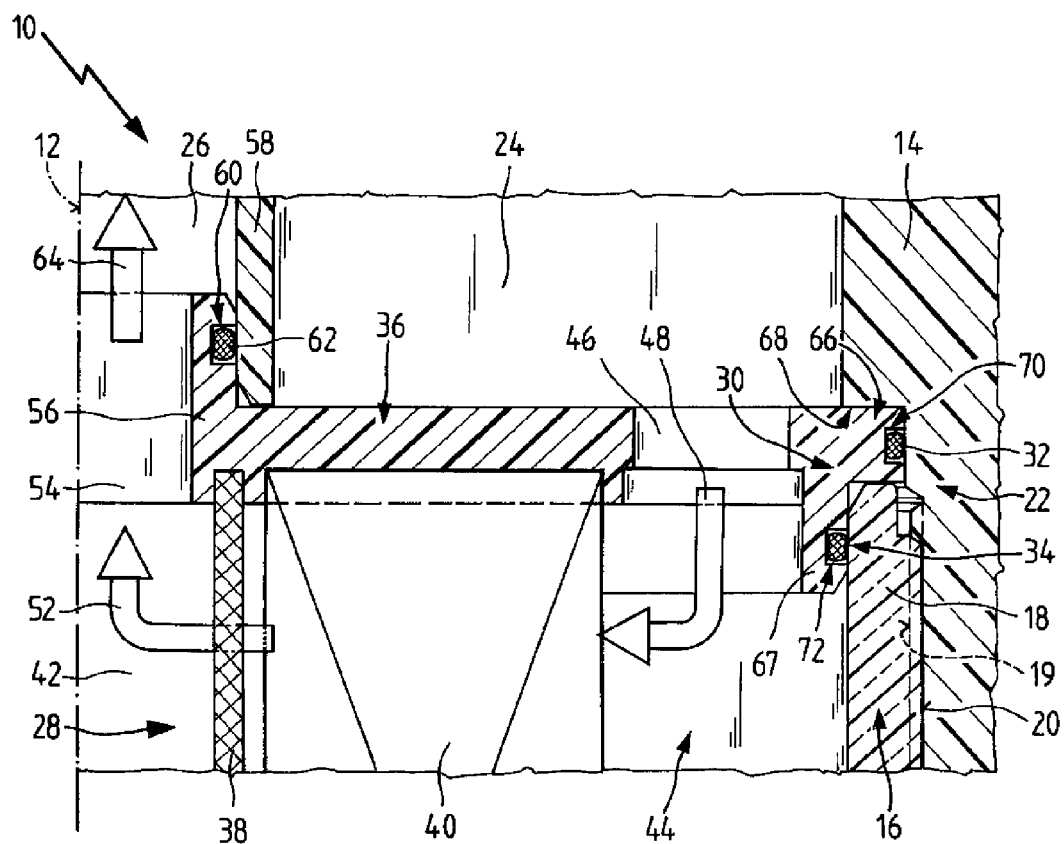
FIG. 1 shows schematically a detail view of a first embodiment of a filter system in the area of a sealing device for sealing a filter head relative to a filter cup.

FIG. 1 illustrates in section one half of a filter system 10, that as a whole is referenced by reference numeral 10, for filtration of liquid or gaseous fluids of a motor vehicle. The filter system 10 as a whole is symmetric to a symmetry axis 12 that is shown in FIG. 1. When in the following reference is being had to radial and/or axial, this refers in the mounted state of the filter system 10 to the symmetry axis 12. The same holds true for the individual components when not mounted.

The filter system 10 can be used, for example, for filtration of combustion air or compressed air, fuel, in particular diesel fuel or gasoline, motor oil or hydraulic oil.

The filter system 10 comprises a filter head 14 and a filter cup 16 of shape-stable material, for example, plastic material. The filter cup 16 that is open toward the filter head 14 has in its rim area 18 on the radial outer circumferential side an outer thread 20. The filter head 14 has a cup-shaped receiving space 22 that is open toward the filter cup 16 and is of a stepped configuration with an inner thread 19 matching the outer thread 20. The filter cup 16 is screwed with its rim area 18, connected from below in a suspended arrangement, into the receiving space 22 of the filter head 14. The filter cup 16 is in this way detachably mounted on the filter head 14 and in this way functionally connected with an annular inflow chamber 24 for fluid to be filtered and a drainage passage 26 for filtered fluid in the filter head 14.

Figure 2:
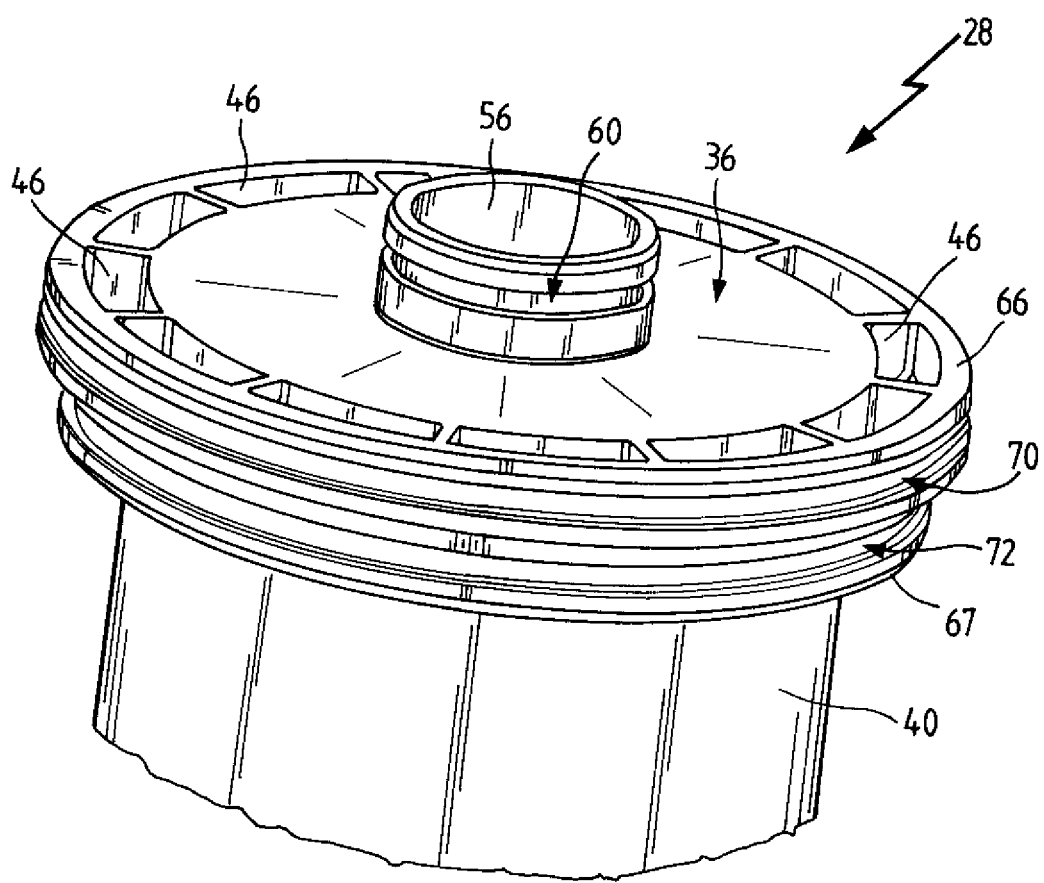
FIG. 2 shows schematically an isometric illustration of a filter element of the filter system of FIG. 1 in the area of the sealing device.

In the filter cup 16 an exchangeable round filter element 28 of the filter system 10 is inserted axially to the symmetry axis 12. In FIG. 2, the round filter element 28 is shown in a detail view.

The filter system 10 comprises a sealing device 30 with two separate sealing areas in the form of O-ring seals 32 and 34 for sealing the filter head 14 relative to the filter cup 16.

The round filter element 28 has at its end face that is facing the rim area 18 of the filter cup 16 a connecting end disk 36. On its end face that is facing away from the connecting end of the filter cup 16 and that is not shown in FIGS. 1 and 2, the round filter element 28 has a second end disk whose base surfaces extend parallel to those of the connecting end disk 36. The skeleton-like support pipe 38 extends between connecting end disk 36 and the second end disk (not shown). The connecting end disk 36, the second end disk and the support pipe 38 are made from plastic material; an embodiment of the end disks or/and of the central pipe of metal also represents a possible embodiment.

The support pipe 38 is surrounded by a filter medium 40 in the form of a filter bellows of a zigzag-shaped folded nonwoven. The support pipe 38 limits an interior 42 of the filter medium 40 which forms the clean fluid side of the filter medium 40.

The filter medium 40 is surrounded by an annular inlet space 44 that forms the raw fluid side of the filter medium 40. The annular inlet space 44 is connected by means of a plurality of through openings 46 in the connecting end disk 36 with the annular inflow space 24 of the filter head 14. The fluid to be filtered can flow from the annular inflow space 24 in the direction of an arrow 48 into the annular inlet space 44. The through openings 46 are distributed uniformly in an area between the filter medium 40 and a radial outer rim area 66 of the connecting end disk 36, as shown in FIG. 2. The filter medium 40 can be flowed through by the fluid to be filtered from the annular inlet space 44 to the interior 42 in radial direction from the exterior to the interior, as indicated in FIG. 1 by arrows 48 and 52.

The connecting end disk 36 has an end disk opening 54 that is concentric to the support pipe 38. A hollow cylindrical connecting pin 56 of the connecting end disk 36 surrounds the end disk opening 54 and extends from the base surface of the connecting end disk 36 that is facing away from the support pipe 38 axially in outward direction.

The connecting pin 56 in the mounted position shown in FIG. 1 is received in a receiving sleeve 58 of the filter head 14. In the radial outer circumferential side of the connecting socket 56 a circumferentially extending sealing groove 60 with an O-ring seal 62 is provided. The O-ring seal 62 is supported seal-tightly in radial direction on the base of the sealing groove 60 and on the radial inner circumferential surface of the receiving sleeve 58.

In the interior of the receiving sleeve 58 the discharge passage 26 for the filtered fluid extends in axial direction and passes through the filter head 14 to exit from the filter system 10. The filtered fluid can flow in the direction of arrow 52 from the interior 42 of the round filter element 28 through the end disk opening 54 and the interior of the connecting socket 56 in the direction of an arrow 64 into the discharge passage 26.

The radial outer rim area 66 of the connecting end disk 36 is secured in axial direction between the end face of the rim of the filter cup 16 and a matching annular stop surface 68 of the filter head 14 that is coaxial to the receiving space 22 and extends circumferentially. The annular stop surface 68 delimits in axial direction the receiving space 22. The inner thread 19 of the receiving space 22 of the filter head 14 ends at the side of the connecting end disk 36 that is opposite to the annular stop surface 68 in axial direction. The thread-free area of the inner wall of the receiving space 22 has a smaller inner diameter in comparison to the thread area.

In the circumferential surface of the radial outer rim area 66 there is a circumferentially extending sealing groove 70 in which the O-ring seal 32 is fixedly secured. The O-ring seal 32 is supported at the base of the sealing groove 70 in radial direction in a seal-tight way and seals the connecting end disk 36 relative to the thread-free area of the inner wall of the receiving space 22 of the filter head 14.

On the side that is facing the annular inlet space 44 the connecting end disk 36 has a hollow cylinder 67 that is coaxial to the symmetry axis 12. The radial outer circumferential surface of the hollow cylinder 67 in comparison to the circumferential surface of the radial outer rim area 66 is displaced inwardly in radial direction. In the radial outer circumferential surface of the hollow cylinder 67 the circumferential sealing groove 72 is provided in which the O-ring seal 34 is fixedly secured. The O-ring seal 34 is supported on the base of the sealing groove 72 in radial direction and seals the connecting end disk 36 relative to the filter cup 16.

In operation of the filter system 10 the rim area 66 and the hollow cylinder 67 are pressed outwardly in radial direction as a result of the fluid system pressure existing in the annular inflow space 24 and in the annular inlet space 44 so that the sealing action is enhanced.

For exchanging the round filter element 28, first the filter cup 16 is unscrewed from the receiving space 22 of the filter head 14 and pulled out parallel to the symmetry axis 12 in the downward direction in case of the suspended arrangement as illustrated in FIG. 1. Subsequently, the round filter element 28 is pulled parallel to the symmetry axis 12 out of the now open filter cup 16. In this connection, the round filter element 28 can be simply and easily gripped by the connecting pin 56 so that soiling of hands or a tool that may be employed is kept at a minimum.

The round filter element that is to be newly inserted and that is identical to the round filter element 28 is inserted, with the end disk opposite the connecting end disk 36 leading, parallel to the symmetry axis 12 into the filter cup 16. The hollow cylinder 67 is immersed into the filter cup 16. In the end position the surface of the rim area 66 of the connecting end disk 36 that is facing the rim of the filter cup 16 rests against the end face of the rim area 18 of the filter cup 16. The O-ring seal 34 seals the connecting end disk 36 relative to the filter cup 16. For facilitating mounting, the edge of the free rim of the hollow cylinder 67 at the radial outer circumferential side and the edge of the free rim at the radial inner side of the rim area 18 of the filter cup 16 are beveled.

The filter cup 16 with the round filter element 28 is inserted from below parallel to the symmetry axis 12 into the receiving space 22 of the filter cup 14 and is screwed in to such an extent that the rim area 66 of the connecting end disk 36 rests against the annular stop surface 68 of the filter head 14 and the round filter element 28 is thus fixed in axial direction. The O-ring seal 32 seals the connecting end disk 36 in radial direction relative to the filter head 14.

For facilitating mounting, the edge of the rim of the radial outer circumferential side of the rim area 66 that is facing the annular stop surface 68 is beveled.

Upon insertion of the filter cup 16 the connecting pin 56 of the round filter element 28 is immersed at the same time into the receiving sleeve 58 of the filter head 14 and is sealed by means of the O-ring seal 62 in radial direction.

For facilitating mounting, the edge of the free rim of the radial outer circumferential surface of the connecting pin 56 and the edge of the free rim of the radial inner circumferential surface of the receiving sleeve 58 are beveled.

Figure 3:
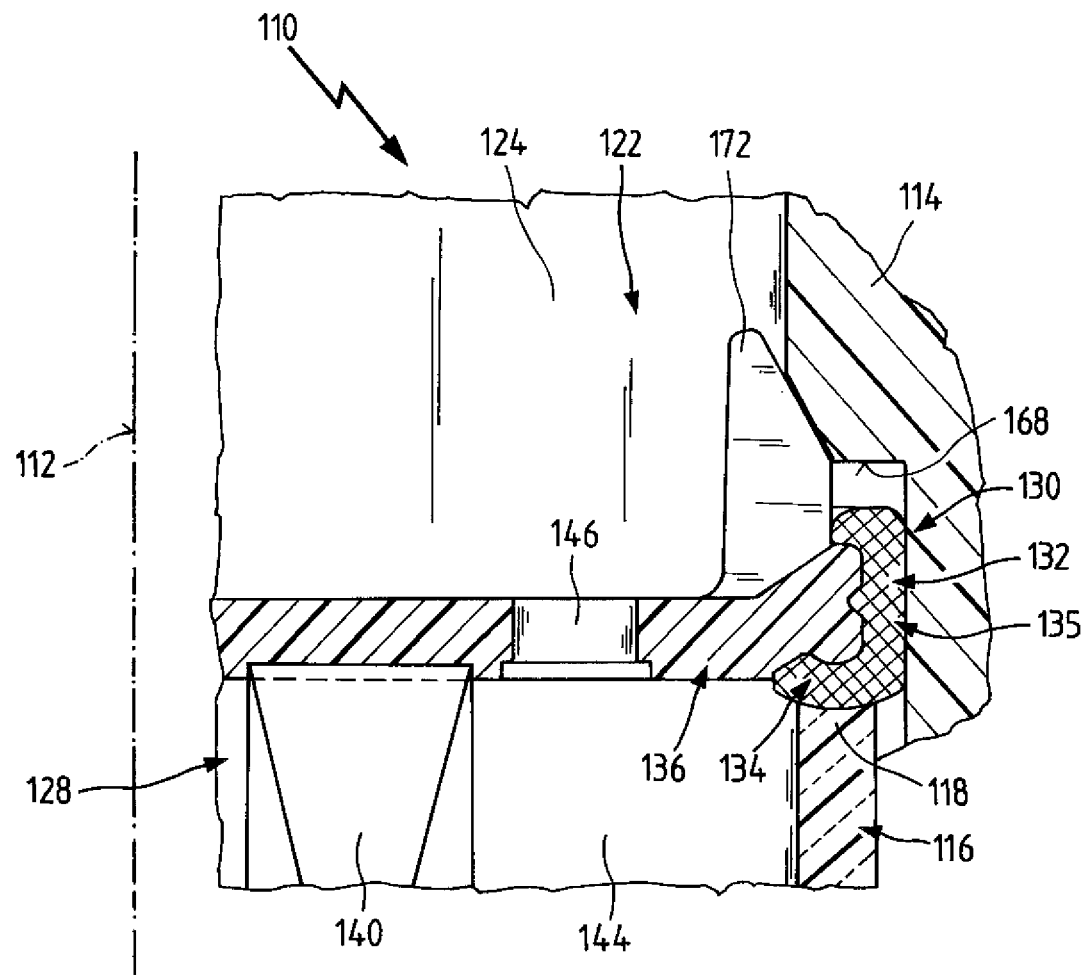
FIG. 3 shows schematically a detail view of a second embodiment of a filter system in the area of a sealing device for sealing a filter head relative to a filter cup.

In a second embodiment, illustrated in FIG. 3, those elements that are similar to those of the first embodiment illustrated in FIGS. 1 and 2 are referenced with the same reference numerals with 100 added so that in regard to their disclosure reference is being to the description regarding the first embodiment. This embodiment differs from the first one in that instead of the two O-ring seals 32 and 34 of the first embodiment corresponding sealing areas 132 and 134 for sealing relative to the filter head 114 and relative to the filter cup 116 are realized as a contiguous seal 135. The seal 135 has a profile that engages the radial outer rim of the connecting end disk 136 on both sides. The seal 135 is injection-molded to the connecting end disk 136 and forms in this way a two-component part.

The sealing area 134 is supported on the base surface of the connecting end disk 136 that is facing the filter cup 116 and on the end face of the rim area 118 of the filter cup 116 in axial direction in a seal-tight way, respectively.

The sealing area 132 is supported on the radial outer circumferential side of the connecting end disk 136 and on the inner wall of the receiving space 122 of the filter head 114 in radial direction in a seal-tight way, respectively.

On the base surface of the connecting end disk 136 that is facing the filter head 114 a plurality of support stays 172 are provided on the radial outer rim and circumferentially distributed whose radial outer sides are slanted in a wedge-shape. The slanted sides of the support stays 172 rest against corresponding slanted portions on the radial inner rim of the annular stop surface 168 of the filter head 114. The support stays 172 serve for maintaining the axial sealing pressure.

In all of the above embodiments of a filter system 10; 110 and a round filter element 28; 128 with a sealing device 30; 130 the following modifications, inter alia, are possible.

The filter system 10; 110 can be used also in industrial motors instead of in motor vehicles.

Instead of employing a screw connection, the filter cup 16; 116 can also be connected detachably to the filter head 14; 114 by a differently designed rotational and/or plug-in connection, for example, a bayonet connection or a different pure plug-in connection.

Also, embodiments are possible in which the filter head has, instead of the cavity-like receiving space, a receiving socket onto which the filter cup can be attached by means of the rotational and/or plug-in movement. The connecting end disk and the sealing device are then matched accordingly so that the receiving socket of the filter head can be inserted into the filter cup.

Instead of the round filter element 28; 128, also a differently designed, preferably coaxial, filter element, for example, also a filter element with an oval or angled base surface, can be used. The filter cup 16; 116 and the round filter element 28; 128 can have instead of a symmetric, preferably cylindrical, shape also a different, for example, angled, shape.

In the first embodiment, it is also possible that only one of the two O-ring seals 32, 34 in radial direction is supported on the connecting end disk 36; the other one can be supported in axial direction. Also, both O-ring seals can be supported in axial direction against the appropriately modified connecting end disk 36.

In place of the O-ring seals 32, 34, also differently designed sealing areas can be provided.

The connecting end disk 36; 136, the second end disk and the support pipe 38 can be made, instead of from plastic material, also of another, preferably hard but still elastic, material.

Also, in the second embodiment the two sealing areas 132, 134 can also be designed such that both are supported in axial or in radial direction on the connecting end disk 136.

Also, more than two sealing areas, for example, O-ring seals, can be provided for sealing the connecting end disk 36; 136 relative to the filter head 14; 114 and relative to the filter cup 16; 116.

The seal 135, instead of being injection-molded onto the connecting end disk 136, can also be realized in another way as two-component parts.

Instead of being suspended from below, the filter cup 16; 116 can also be mounted from above onto the filter head 14; 114 that is then turned up.

While specific embodiments of the invention have been shown and described in detail to illustrate the inventive principles, it will be understood that the invention may be embodied otherwise without departing from such principles.

The invention claimed is:

1. A filter system for filtering fluids, the filter system comprising:
   a filter head;
   a filter cup with a rim area, wherein said filter cup is connected detachably by said rim area by a rotational and/or plug-in movement to said filter head;
   a filter element that is exchangeably arranged in said filter cup;
   a sealing device with several sealing areas, said sealing device sealing said filter head relative to said filter cup;
   wherein said filter element comprises a connecting end disk arranged at an end face of said filter element that is facing said rim area of said filter cup;
   wherein on said connecting end disk at least two of said sealing areas of said sealing device are arranged so as to extend circumferentially in such a way that a first one of said sealing areas seals said connecting end disk relative to said filter head and a second one of said sealing areas seals said connecting end disk relative to said filter cup;
   wherein said sealing device is arranged at a radially outer rim of said connecting end disk, said sealing device including
       said first seal area including a circumferentially extending first sealing groove arranged on said radially outer rim of said connecting end disk;
       wherein a first seal ring is arranged in said first sealing groove, said first seal ring sealing between said radially outer rim and said filter head;
       an axially inwardly extending hollow cylinder provided on an axially inwardly facing side of said connecting end disk and extending into said filter cup, said axially extending hollow cylinder spacing radially inwardly from said first seal ring;
       said second seal area including a circumferentially extending second sealing groove arranged on a radially outer circumferential surface of said axially extending hollow cylinder;
       wherein a second seal ring is arranged in said second sealing groove, said second seal ring sealing between said radially outer circumferential surface of said axially extending hollow cylinder and said filter cup.

2. The filter system according to claim 1, wherein said axially extending hollow cylinder and said radially outer rim are coaxial.

3. The filter system according to claim 1, wherein said filter cup and said filter element are cylindrical.

4. The filter system according to claim 1, wherein said filter element is a round filter element or is an oval filter element with an oval base surface.

5. The filter system according to claim 1, wherein a radial outer rim area of said connecting end disk in axial direction is secured between said filter head and said filter cup.

6. The filter system according to claim 1, wherein at least one of said first and second sealing areas is supported at least section-wise on said connecting end disk in a radial direction of said connecting end disk in a seal-tight way.

7. The filter system according to claim 1, wherein at least one of said first and second sealing areas is supported at least section-wise on said connecting end disk in an axial direction of said connecting end disk in a seal-tight way.

8. The filter system according to claim 1, wherein said first and second sealing areas are arranged separate from one another.

9. The filter system according to claim 1, wherein said first and second sealing areas are contiguous.

10. The filter system according to claim 1, wherein at least one of said first and second sealing areas is formed as a two-component part together with said connecting end disk.

11. The filter system according to claim 1, wherein said connecting end disk has a plurality of fluid openings that are connected with a raw fluid side of a filter medium of said filter element.

12. The filter system according to claim 1, wherein said connecting end disk has a plurality of fluid openings that are connected with a clean fluid side of a filter medium of said filter element.

13. A filter element of a filter system for filtering fluids, wherein the filter system comprises a filter head, a filter cup that is detachably connected with a rim area by a rotational and/or plug-in movement to the filter head, wherein the filter head is sealed relative to the filter cup and wherein the filter element is exchangeably arranged in the filter cup; the filter element comprising:
   a connecting end disk on an end face of the filter element that is facing in a mounted state within the filter system the rim area of the filter cup;
   said connecting end disk having at least two sealing areas arranged thereon so as to extend circumferentially in such a way that in the mounted state a first one of said sealing areas seals said connecting end disk relative to the filter head and a second one of said sealing areas seals said connecting end disk relative to the filter cup;

a sealing device arranged at a radially outer rim of said connecting end disk, said sealing device including
said first seal area including a circumferentially extending first sealing groove arranged on said radially outer rim of said connecting end disk;
wherein a first seal ring is arranged in said first sealing groove, said first seal ring arranged to seal radially between said radially outer rim and said filter head;
an axially inwardly extending hollow cylinder provided on an axially inwardly facing side of said connecting end disk, said axially extending hollow cylinder spacing radially inwardly from said first seal ring;
said second seal area including a circumferentially extending second sealing groove arranged on a radially outer circumferential surface of said axially extending hollow cylinder;
wherein a second seal ring is arranged in said second sealing groove, said second seal ring arranged to seal radially between said radially outer circumferential surface of said axially extending hollow cylinder and said filter cup.

14. The filter element according to claim 13, wherein said axially extending hollow cylinder and said radially outer rim are coaxial.

* * * * *